(12) United States Patent  (10) Patent No.: US 6,561,565 B2
Langguth et al.  (45) Date of Patent: May 13, 2003

(54) SEALING DEVICE FOR THE ROOF PART OF A MOTOR VEHICLE ROOF

(75) Inventors: Martin Langguth, Krailling (DE); Jurgen Stenvers, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/978,177

(22) Filed: Oct. 17, 2001

(65) Prior Publication Data

US 2002/0093217 A1 Jul. 18, 2002

(30) Foreign Application Priority Data

Oct. 17, 2000 (DE) .......................... 100 51 436

(51) Int. Cl.$^7$ ................................ B60J 10/04
(52) U.S. Cl. ................ 296/107.04; 296/107.17
(58) Field of Search ............... 296/107.04, 107.17, 296/146.14; 49/499.1, 475.1

(56) References Cited

FOREIGN PATENT DOCUMENTS

| DE | 40 41 176 A1 | 6/1992 |
| DE | 43 44 373 C1 | 1/1995 |
| DE | 199 34 892 C1 | 10/2000 |

*Primary Examiner*—Joseph D. Pape
(74) *Attorney, Agent, or Firm*—Nixon Peabody LLP; David S. Safran

(57) ABSTRACT

A motor vehicle roof with a sealing device with a seal for sealing a movable roof part with an adjacent motor vehicle part. The seal is pivoted relative to the movable roof part into a sealing position when the movable roof part is moved to a closed position, and the seal is pivoted relative to the movable roof part into a lowered position when the movable roof part is moved to an open position. The seal is connected to a bearing mechanism that allows the seal to be pivoted relative to the movable roof part, and a drive mechanism connecting the movable roof part to the seal in a manner to pivot the seal relative to the movable roof part based on positioning of the movable roof part.

19 Claims, 6 Drawing Sheets

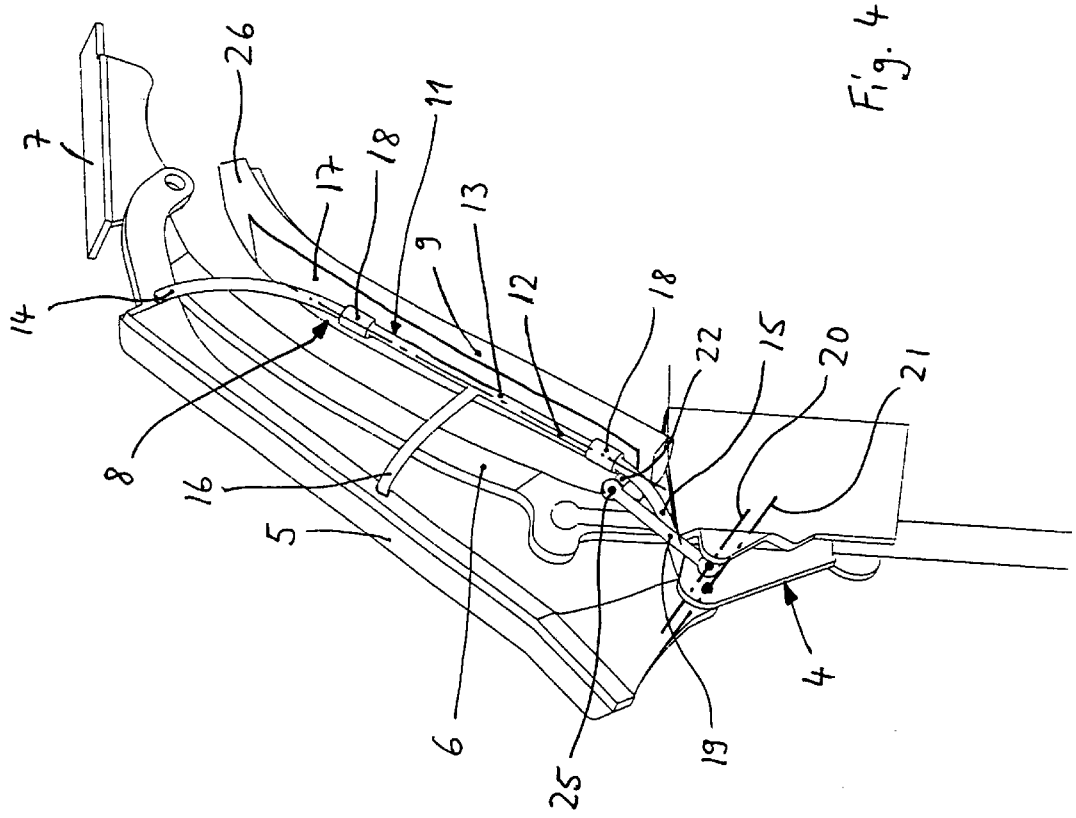

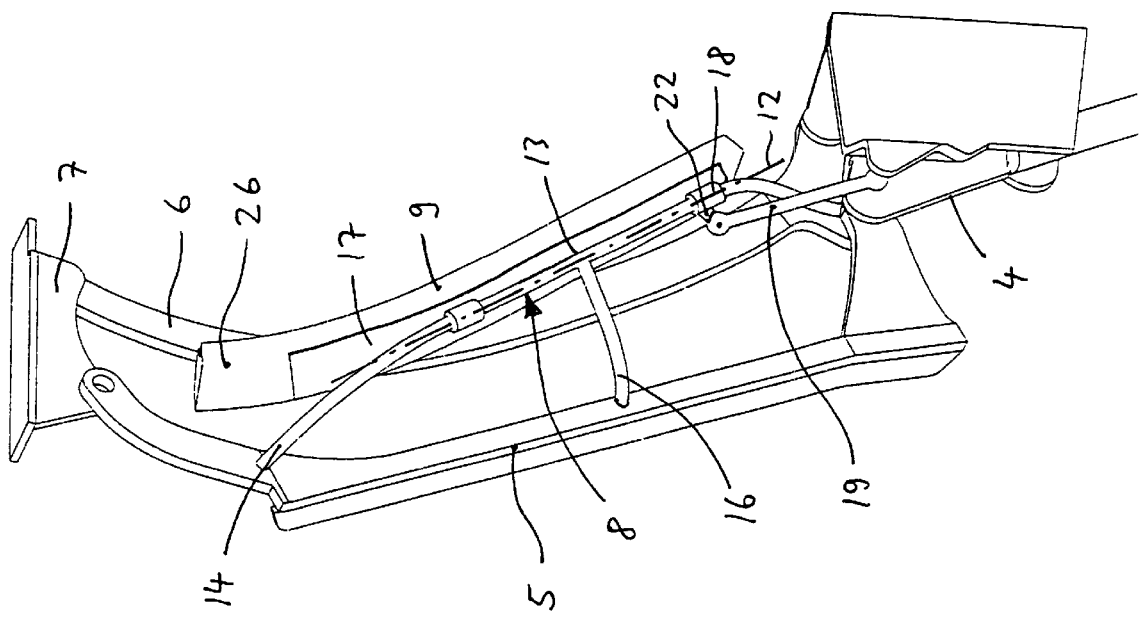

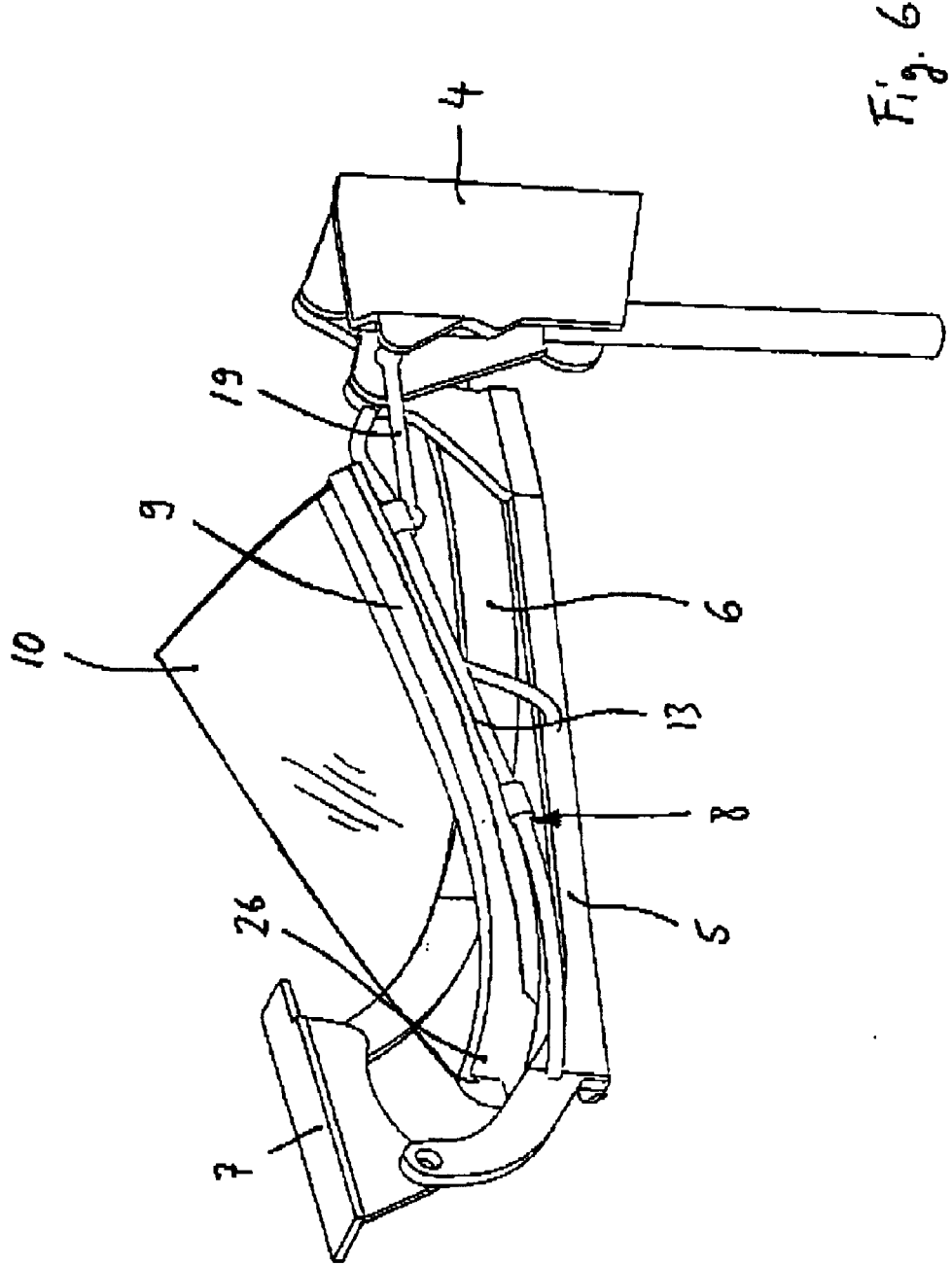

SEALING DEVICE FOR THE ROOF PART OF A MOTOR VEHICLE ROOF

BACKGROUND OF THE INVENTION

1. Field of the Invention

The present invention relates to sealing devices for a roof part of a motor vehicle roof. In particular, the present invention relates to a sealing device with a movably supported seal for sealing the movable roof part relative to the adjacent motor vehicle part.

2. Description of Related Art

German Patent DE 43 44 373 C1 discloses a sealing frame arrangement on lateral frame members of a convertible roof, a folding roof or the like, especially for a convertible or a roadster. One sealing rail at a time is laterally attached to a convertible roof column which supports the convertible roof with the capacity to be lowered, to the rear roof frame part which is pivotally coupled thereto, and also to the front roof frame part which is pivotally coupled to a rear roof frame part. The sealing rail of the rear roof frame part is attached to the rear roof frame part to be movable in the lengthwise direction and is pretensioned forward against the front roof frame part by a spring means. When the convertible roof or roof is opened, the front roof frame part pivots up and enables the sealing rail to move forward so that a gap in the joint between the movably supported sealing rail of the rear roof frame part and the rear sealing rail securely attached to the column of the convertible roof can open before the rear roof frame part is pivoted relative to the convertible roof column. When the roof is lowered, the lengthwise position of the movable sealing rail changes relative to the rear roof frame part. In the side or transverse direction, the position of the sealing rail does not change relative to the roof frame part.

SUMMARY OF THE INVENTION

A primary advantage of the present invention is in providing a sealing device and a motor vehicle roof with such a sealing device which can be moved from its sealed position, into a compact arrangement with respect to the movable roof part when the movable roof part is moved.

This advantage is attained in the sealing device in accordance with the present invention in which the seal being supported is adapted to be able to pivot relative to the movable roof part, is displaceable relative to the roof part into its sealing position when the movable roof part assumes the position to be sealed such as when the roof part is closed, and is pivoted into a lowered position when the movable roof part is moved in a position where a sealing function is not required such as when the roof part is opened. Relative to the lengthwise displacement of the seal, the position of the seal can be adjusted in which it assumes a preferred position relative to the movable roof part by pivoting motion on a short path of motion.

According to one preferred embodiment of the present invention, the seal which has been pivoted into its lowered position enables directly bordering positioning of the movable roof part on another motor vehicle part, especially on a roof part. Thus the roof part, or a side edge of the roof part, can be moved into a compact position which borders the motor vehicle part because of the pivoted seal when the entire seal is in its pivoted position so that reduced height or thickness dimension is attained.

The present invention is also advantageous when at least one section of the seal located in its pivoted-in, lowered position on the roof part, assumes the position which enables the movable roof part to be positioned directly adjacent another motor vehicle part. Thus, for example, this section is located essentially closely adjoining the roof part in the pivoted-in, lowered position. While the stationary seals or those which can be moved lengthwise as a result of their necessary shape and sealing position often project from the roof part and thus, take up additional space, the pivotally supported seal can be moved into a compact arrangement.

In one embodiment, to move the seal, a drive mechanism may be provided which, for instance, may be formed as a coupling means which couples the movable seal to the movable roof part or the roof part which executes relative motion relative to the seal. The coupling means can be a coupling rod, a coupling mechanism or a spring.

In one embodiment, to achieve a compact arrangement of the pivoted seal, the seal is supported to be able to pivot around a pivoting axis which runs roughly along the edge of the roof part to be sealed. For seals which run clearly bent or offset, the pivoting axis may also run at an angle to the edge to be sealed.

In one preferred embodiment the movable roof part is a part of a motor vehicle roof which is adapted to be lowered in a stowage space, and the motor vehicle roof may be a convertible roof or a hardtop. The hardtop can have two or more fixed roof elements which can be lowered in various ways into a lowered or stowage space in the motor vehicle rear.

In particular, the movable roof part is the rear roof part of a hardtop roof which is underneath the front roof part when being lowered. For one such roof, for example, the front roof part and the rear roof part can be lowered by a bearing mechanism into the storage space in the motor vehicle rear, and the seal for a side window which is located laterally on the rear roof part can be pivoted inward when the rear roof part is being lowered. The seal can be pivoted in such that the rear roof part and the front roof part can lie tightly on one another and thus, the height of the storage space can be reduced by approximately the size of the seal.

Furthermore, in accordance with another embodiment of the present invention, the seal carrier of the seal is pivotally supported on a pivoting bearing mechanism which is located on a pivoting connecting rod that movably supports the rear roof part on the body or on the main column of the main mechanism.

The sealing device may be made such that the seal or the seal carrier is coupled to an assigned side window and can be pivoted with the seal into a pivoted-in, compact, lowered position. Thus, a separate lowering mechanism for the rear side window is not necessary.

These and other advantages and features of the present invention will become more apparent from the following detailed description of the preferred embodiments when viewed in conjunction with the accompanying drawings.

BRIEF DESCRIPTION OF THE DRAWINGS

FIG. 3 schematically shows a side view of the motor vehicle roof of FIG. 1 in its folded-together, lowered position with the seal pivoted in;

FIG. 4 shows a side view of the main mechanism of the motor vehicle roof shown in FIG. 1 with the seal supported thereon in the closed position;

FIG. 5 shows a side view of the main mechanism of the motor vehicle roof in the intermediate position of FIG. 2 with the seal in the intermediate position; and FIG. 6 shows a side view of the main mechanism of the motor vehicle roof in the folded-together, lowered position of FIG. 3 with the seal pivoted in.

DETAILED DESCRIPTION OF THE PREFERRED EMBODIMENT

Figure 1:
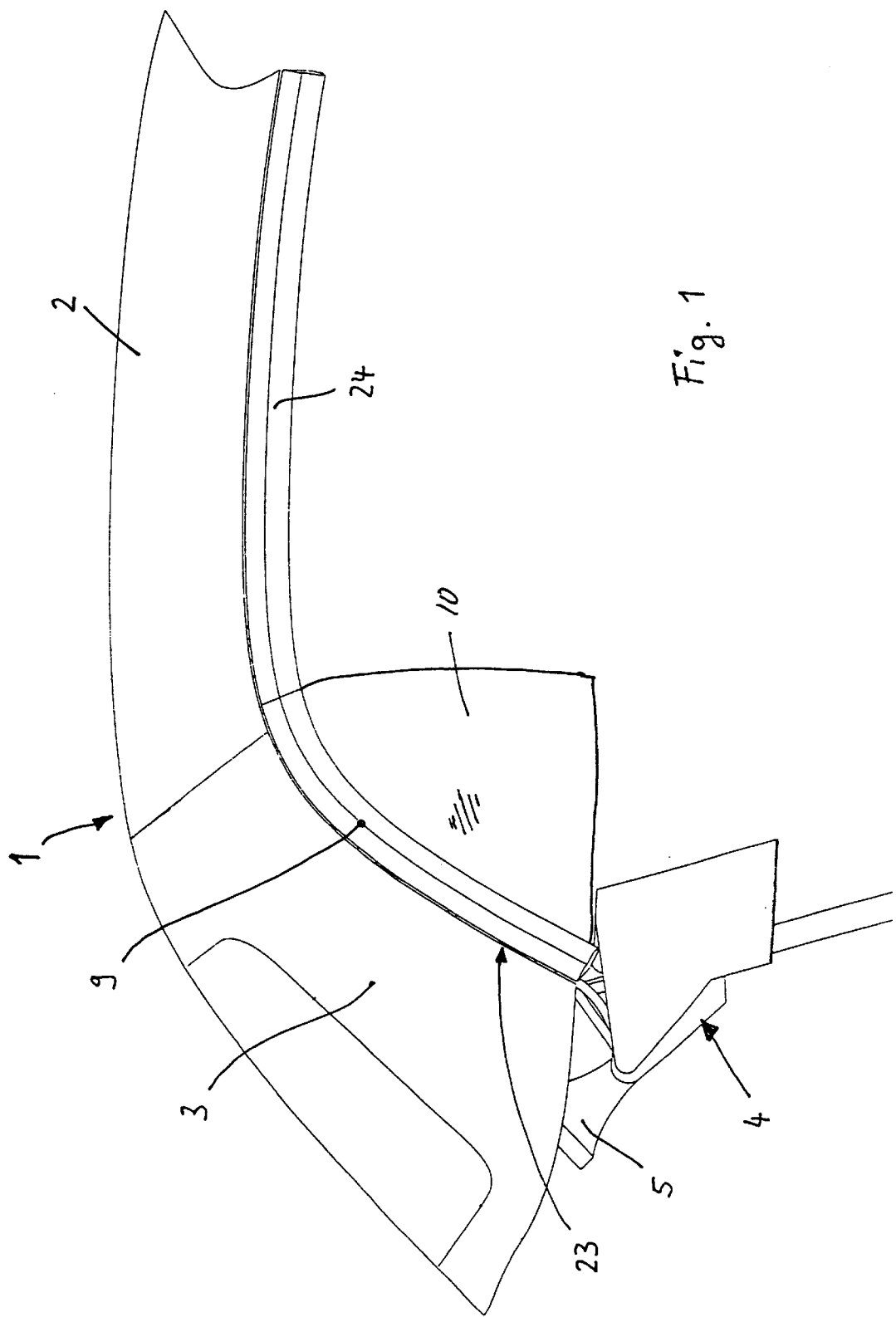
FIG. 1 schematically shows a partial side view of a motor vehicle roof with a side seal in the closed position in accordance with one embodiment of the present invention.
Figure 2:
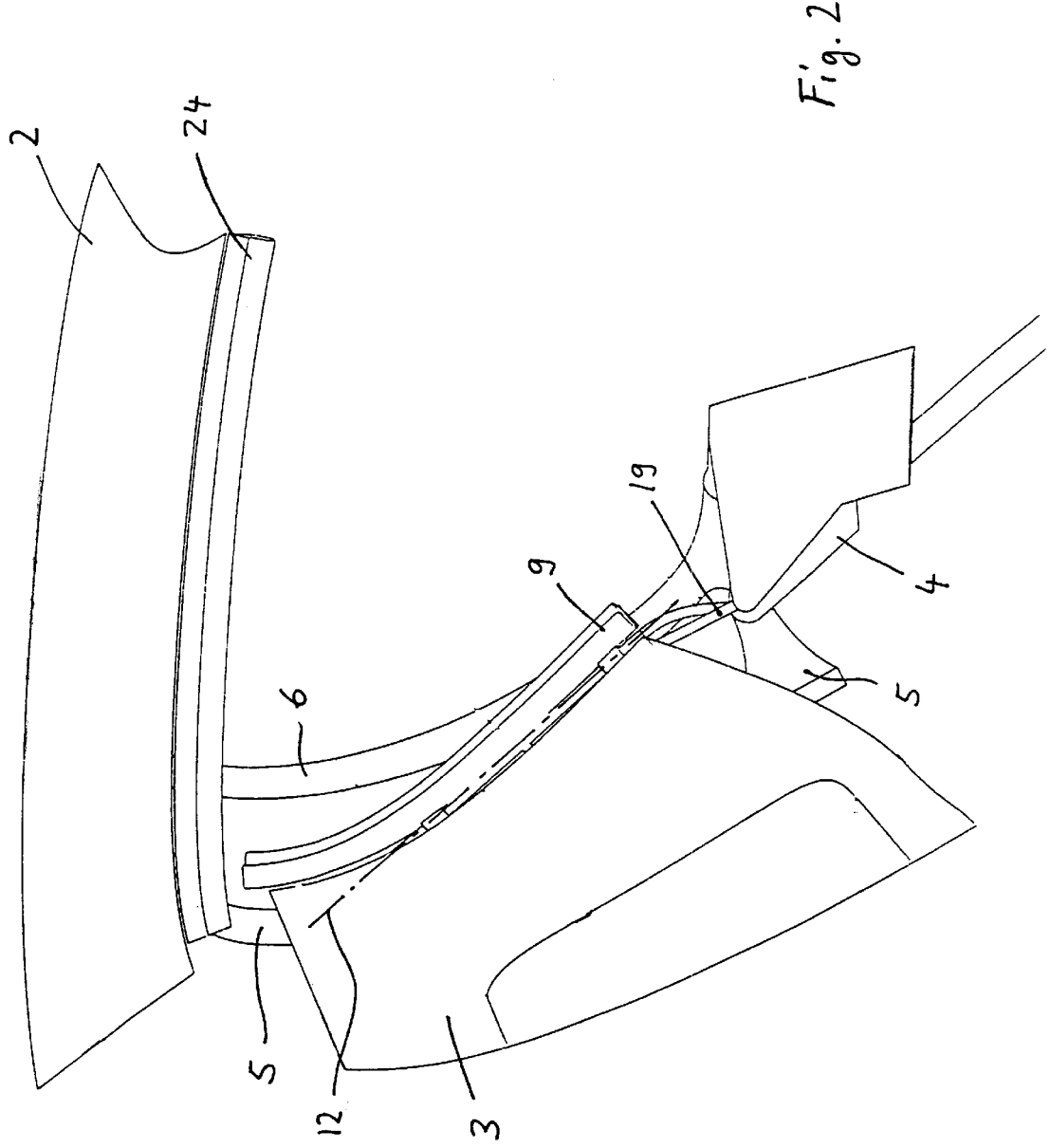
FIG. 2 schematically shows a side view of the motor vehicle roof of FIG. 1 in an intermediate position as it is lowered into a storage space.

A hardtop vehicle roof 1 of a convertible type motor vehicle roof contains a front roof part 2 and a rear roof part 3 which are shown in FIG. 1 in the closed position. A main bearing mechanism for movable support of the motor vehicle roof 1 includes a vehicle-mounted main bearing 4 on either side of the vehicle which is located on the body of the motor vehicle (not shown). In this regard, FIG. 4 more clearly shows the various components described herein and should be referred to for clarity. The main bearing 4 is coupled to the main column 5 and the main connecting rod 6 in a four-bar mechanism which can be moved in the manner of a parallelogram to be able to pivot as shown in FIG. 2 and FIG. 4. As can be clearly seen in FIG. 4, the opposite ends of the main column 5 and of the main connecting rod 6 are pivotally mounted on the carrier element 7 to which the front roof part 2 of FIG. 1 is attached.

The main column 5 represents the bearing component for the rear roof part 3 and the rear roof part 3 is attached thereto. A bearing mechanism 8 for a side seal 9 seals the rear roof part 3 relative to the rear side window 10 which is shown schematically in FIG. 1. The bearing mechanism 8 includes a bearing rod 11 with a middle section 13 which fixes the pivoting axis 12. The bearing rod 11 also includes mounting ends 14 and 15 which are guided to the main column 5 and are attached thereto. A middle brace 16 supports the bearing rod 11 on the main column 5 as well. The seal carrier 17 of the seal 9 is mounted and axially fixed via two bearing sleeves 18 on the bearing rod 11 so that it is able to pivot around the pivoting axis 12.

In the present illustrated example, a coupling rod 19 is mounted on the main bearing 4 and is used as the drive mechanism or connection that provides the pivoting motion of the seal 9. As can be seen in FIG. 4, the coupling rod 19 is offset relative to the pivoting bearing axis 21 of the main column 5 and is also hinged to the pivoting journal 22 of the seal carrier 17 so as to allow the seal 9 to be pivoted around the pivoting bearing axis 20. In particular, by pivoting the main column 5 as the motor vehicle roof 1 is opened or closed, the seal carrier 17 is forcibly pivoted by the simultaneous pivoting motion of the coupling rod 19 into the respective direction around the pivoting axis 12.

FIGS. 1 & 4 show the closed position of the motor vehicle roof 1. As can be seen, the seal 9 is located in its active seal position along the side edge 23 of the rear roof part 3 so that the rear side window 10 can be sealed, and borders the front seal 24 which is attached to the front roof part 2.

When the motor vehicle roof 1 is opened, the main column 5 and the main connecting rod 6 are pivoted to the rear via a drive (not shown). In the intermediate position as shown in FIGS. 2 and 5, the main column 5 with the rear roof part 3 attached thereto is pivoted to the rear around the lower pivoting bearing axis 21 shown in FIG. 4 and the front roof part 2 is lowered in the direction to the rear roof part 3. The coupling rod 19 which pivots around its lower pivoting bearing axis 20 moves its end 25 which is coupled to the seal carrier 17, with respect to the pivoting axis 12 to the outside or appropriate direction such that in this way, the seal carrier 17 with the seal 9 is pivoted inward towards the inside or bottom of the rear roof part 3.

Since the front end 26 of the seal 9 projects from the pivoting bearing axis 12 according to the curvature of the side edge 23 of the rear roof part 3 or the top edge of the side window 10, this front end 26 of the seal 9 which projects laterally in the sealed position of FIG. 4 is moved in a pivoting motion towards the vehicle center, by which the total width or thickness of the rear roof part 3 including the seal 9 is reduced.

Figure 3:
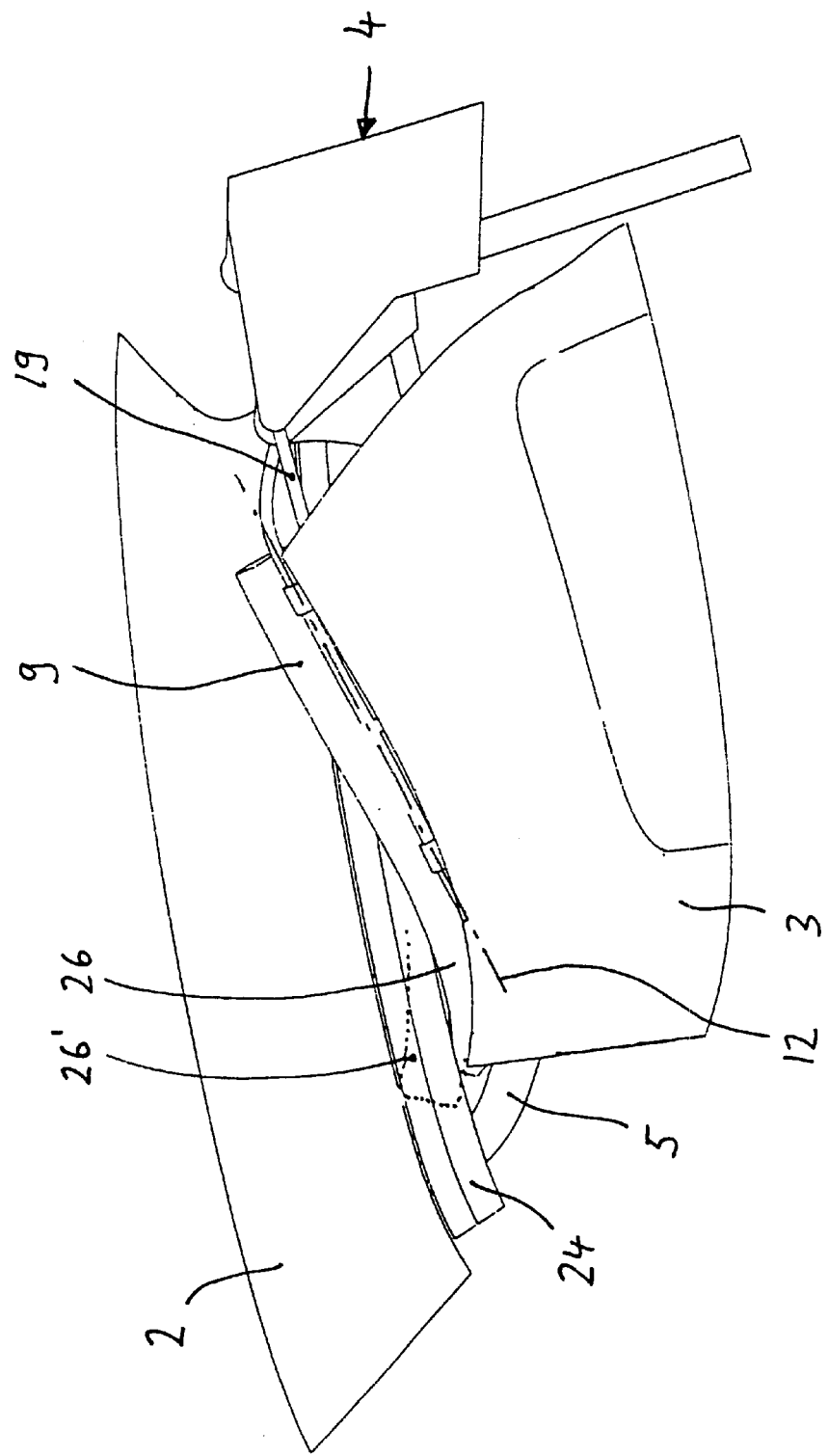

In the folded-together, lowered position of the motor vehicle roof 1 shown in FIGS. 3 & 6, in which the rear roof part 3 and the front roof part 2 are positioned on top of one another in an opposite arch, the seal carrier 17 with the seal 9 is in its completely pivoted-in position in which the front end 26 of the seal 9 is positioned or tucked under the seal 24 of the front roof part 2. In this lowered position, the height (or thickness) space requirement for the lowered motor vehicle roof 1 is clearly reduced as compared to the conventional permanently attached window seal. In this regard, FIG. 3 shows such a conventional permanently attached window seal 26' (schematically shown with a broken line) to show the additional height space that would be required. In one application of the present invention, height reductions of 40 mm or even more may be attained since in accordance with the present invention, the seal 24 of the front roof part 2 is positioned over the pivoted seal 9 of the rear roof part 3.

Pivoting seal in accordance with the present invention may also be used on side roof rods of folding bars in convertible roofs, and also in covers of sliding roofs or in louvers of louvered roofs, when it is desirable to have a seal be moved as these roofs are moved to a cover position or louver position.

In addition, the pivoting axis 12 need not be stationary, but it may also be movably guided relative to the movable roof part when the seal 9 is pivoted.

According to one alternative configuration, the side window 10 may be coupled to the bearing mechanism 8 or the seal carrier 17 or the seal 9 such that when the seal 9 is pivoted the window can be moved at the same time with the seal out of its normal position on the body into a lowered position (not shown).

The bearing mechanism 8 for the pivoting seal 9 is shown by way of example only and can also be formed with other mechanisms which allow pivoting motion. This bearing mechanism or other bearing mechanism can also be attached directly to the rear roof part 3.

While various embodiments in accordance with the present invention have been described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A roof arrangement for a motor vehicle, comprising: a movable roof part;
   a bearing mechanism; and
   a sealing device for sealing said movable roof part relative to another motor vehicle part, comprising:
   a seal connected to said bearing mechanism that allows said seal to be pivoted relative to said movable roof part; and a drive connection for connecting said seal to the movable roof part in a manner enabling said seal to pivot relative to the movable roof part based on positioning of the movable roof part;

wherein said seal is pivotable relative to the movable roof part into a sealing position when the movable roof part is moved to a closed position, and said seal is pivotable relative to the movable roof part into a pivoted-in position when the movable roof part is moved to an open position.

2. The roof arrangement as claimed in claim 1, wherein said drive connection for pivoting said seal includes a coupling rod which is adapted to connect said seal to the movable roof part.

3. The roof arrangement as claimed in claim 2, wherein said bearing mechanism defines a pivoting axis about which said seal is pivotable.

4. The roof arrangement as claimed in claim 1, wherein said seal is mounted to a seal carrier which is pivotally supportable relative to the movable roof part.

5. The roof arrangement as claimed in claim 4, wherein said seal carrier is pivotally supported on said bearing mechanism, said bearing mechanism being connected to a main column which is adapted to support a rear roof part.

6. The roof arrangement as claimed in claim 1, wherein said drive connection for pivoting said seal includes a coupling rod which is adapted to support a rear roof part.

7. The roof arrangement as claimed in claim 1, wherein said bearing mechanism defines a pivoting axis about which said seal is pivotable.

8. The roof arrangement as claimed in claim 1, wherein said seal is mounted to a seal carrier which is pivotally supported to the movable roof part.

9. The roof arrangement as claimed in claim 8, wherein said seal carrier is pivotally supported on said bearing mechanism, said bearing mechanism being connected to a main column which supports a rear roof part.

10. A motor vehicle roof comprising:
a movable roof part which is movable between a closed position and an open position;
an adjacent motor vehicle part located adjacent to said movable roof part;
a sealing device with a seal for sealing said movable roof part with respect to said adjacent motor vehicle part; and
a drive connection which is adapted to pivot said seal into a sealing position relative to said movable roof part when said movable roof part is moved to a closed position and to pivot said seal into a pivoted-in position relative to said movable roof part when said movable roof part is moved to an open position.

11. The motor vehicle roof as claimed in claim 10, wherein, said lowered position of the seal enables the height of the movable roof part in the closed position to be reduced so as to allow the movable roof part to directly border said adjacent motor vehicle part.

12. The motor vehicle roof as claimed in claim 10, wherein said drive connection comprises a drive mechanism connecting said movable roof part to said seal in a manner to pivot said seal relative to the movable roof part based on positioning of said movable roof part.

13. The motor vehicle roof as claimed in claim 12, wherein said drive mechanism for pivoting said seal includes a coupling rod.

14. The motor vehicle roof as claimed in claim 12, wherein a bearing mechanism is provided, said bearing mechanism defining a pivoting axis and wherein said seal is pivotable relative to the movable roof part about said pivoting axis, said pivoting axis extending approximately along an edge of the movable roof part.

15. The motor vehicle roof as claimed in claim 14, wherein said seal is mounted to a seal carrier which is pivotally supported relative to the movable roof part by said bearing mechanism, said bearing mechanism being connected to a main column which supports a rear roof part.

16. The motor vehicle roof as claimed in claim 10, wherein said motor vehicle roof is a convertible roof and said movable roof part is adapted to be lowered in a stowage spare.

17. The motor vehicle roof as claimed in claim 16, wherein said motor vehicle roof is a convertible hardtop.

18. The motor vehicle roof as claimed in claim 17, wherein said movable roof part is a rear roof part of a convertible hardtop roof which is positioned underneath a front roof part when said motor vehicle roof is in said open configuration.

19. The motor vehicle roof as claimed in claim 18, wherein the adjacent motor vehicle part is a side window connected to said sealing device in a manner that said side window is pivoted into a pivoted-in, compact lower position together with said seal.

* * * * *